US010308342B2

(12) United States Patent
Staal et al.

(10) Patent No.: US 10,308,342 B2
(45) Date of Patent: Jun. 4, 2019

(54) METHOD OF REPAIRING DAMAGE TO FUSELAGE BARREL AND ASSOCIATED APPARATUS AND SYSTEM (71) Applicant: The Boeing Company, Chicago, IL (US)

(72) Inventors: Remmelt Andrew Staal, Shoreline, WA (US); Narbeh Nersessian, Sun Valley, CA (US); Gary D. Oakes, Renton, WA (US)

(73) Assignee: The Boeing Company, Chicago, IL (US)

( * ) Notice: Subject to any disclaimer, the term of this patent is extended or adjusted under 35 U.S.C. 154(b) by 282 days.

(21) Appl. No.: 15/258,919

(22) Filed: Sep. 7, 2016

(65) Prior Publication Data
US 2018/0065761 A1  Mar. 8, 2018

(51) Int. Cl.
B64C 1/06 (2006.01)
B64F 5/40 (2017.01)
B64C 1/00 (2006.01)

(52) U.S. Cl.
CPC ............... B64C 1/06 (2013.01); B64C 1/068 (2013.01); B64C 1/069 (2013.01); B64F 5/40 (2017.01); B64C 2001/0072 (2013.01)

(58) Field of Classification Search
CPC ........... B64C 1/06; B64C 1/068; B64C 1/069; B64C 2001/0072; B64F 5/40; B64F 5/0081
See application file for complete search history.

(56) References Cited

U.S. PATENT DOCUMENTS 6,849,150 B1 * 2/2005 Schmidt ................ B33Y 50/00
156/285
8,985,512 B1 * 3/2015 Chan ..................... B64C 1/061
244/120

(Continued)

FOREIGN PATENT DOCUMENTS

EP 2727821 5/2014
EP 2848394 3/2015
EP 2873620 5/2015

OTHER PUBLICATIONS

Extended European Search Report for European Patent Application No. 17180646.6 dated Dec. 8, 2017.

Primary Examiner — Timothy D Collins
Assistant Examiner — Tye William Abell
(74) Attorney, Agent, or Firm — Kunzler Bean & Adamson (57) ABSTRACT Disclosed herein is a method of repairing damage to a fuselage barrel, having a one-piece construction, of an aircraft. The method includes determining at least a first virtual splice line and a second virtual splice line along the fuselage barrel in a direction parallel to a longitudinal axis of the fuselage barrel. The method also includes detecting damage in a first section of the fuselage barrel between the first virtual splice line and the second virtual splice line. The method further includes cutting through the fuselage barrel along the first virtual splice line and the second virtual splice line to physically separate the first section from a main section of the fuselage barrel. The method also includes removing the first section from the main section of the fuselage barrel, and splicing a new section to the main section of the fuselage barrel in place of the first section.

14 Claims, 8 Drawing Sheets (56) References Cited

U.S. PATENT DOCUMENTS

| | | | |
|---|---|---|---|
| 2006/0060705 A1* | 3/2006 | Stulc | B64C 1/069 244/119 |
| 2008/0111024 A1 | 5/2008 | Lee et al. | |
| 2009/0095840 A1* | 4/2009 | Roux | B23P 6/00 244/119 |
| 2009/0218445 A1* | 9/2009 | Wood | B64C 1/06 244/131 |
| 2009/0277994 A1* | 11/2009 | Lobato | B64C 1/061 244/119 |
| 2012/0104166 A1 | 5/2012 | Pina Lopez et al. | |
| 2012/0153082 A1* | 6/2012 | Rosman | B64C 1/068 244/120 |
| 2012/0304433 A1* | 12/2012 | Roux | B29C 73/04 29/402.09 |
| 2013/0014367 A1* | 1/2013 | Miller | B29C 73/04 29/402.08 |
| 2013/0019446 A1* | 1/2013 | Venskus | B23Q 1/012 29/407.09 |
| 2014/0001311 A1* | 1/2014 | Dopker | B64C 1/069 244/120 |
| 2015/0059142 A1* | 3/2015 | De Jong | B29C 73/10 29/402.14 |
| 2016/0368585 A1* | 12/2016 | Farouz-Fouquet | B64C 1/064 |

\* cited by examiner

FIG. 10 ically-advanced materials, such as fiber-reinforced polymers, allow for the construction of a one-piece fuselage barrel, which eliminates the need to interconnect numerous panels around the fuselage barrel. Conventional methods of removing and replacing fuselage panels are inadequate for a fuselage barrel made of a once-piece construction. For example, conventional methods of repairing damage to a fuselage barrel having a one-piece construction can be difficult, time-consuming, and expensive, and result in undesirable aesthetics.

METHOD OF REPAIRING DAMAGE TO FUSELAGE BARREL AND ASSOCIATED APPARATUS AND SYSTEM

FIELD

This disclosure relates generally to fuselage barrels of aircraft, and more particularly to repairing fuselage barrels of aircraft made from fiber-reinforced polymers.

BACKGROUND

With typical aircraft having fuselage barrels made from metal, the fuselage barrels include multiple, pre-existing, interconnected segments. Often, the interconnected segments of a conventional fuselage barrel made from metal are coupled together at lap joints when the aircraft is initially assembled prior to first operation of the aircraft. When damage to such a conventional fuselage barrel occurs, the segment or segments of the interconnected segments containing the damage are separated along production splices, removed from the fuselage barrel, and replaced with an undamaged segment or segments. Because conventional fuselage barrels made from metal are initially manufactured to have a multi-piece construction, repair of damage to a conventional fuselage barrel made from metal can be accomplished with relative ease.

Technologically-advanced materials, such as fiber-reinforced polymers, allow for the construction of a one-piece fuselage barrel, which eliminates the need to interconnect numerous panels around the fuselage barrel. Conventional methods of removing and replacing fuselage panels are inadequate for a fuselage barrel made of a once-piece construction. For example, conventional methods of repairing damage to a fuselage barrel having a one-piece construction can be difficult, time-consuming, and expensive, and result in undesirable aesthetics.

SUMMARY

The subject matter of the present application has been developed in response to the present state of the art, and in particular, in response to the problems and disadvantages associated with repairing damage to fuselage barrels having a one-piece construction, that have not yet been fully solved by currently available techniques. Accordingly, the subject matter of the present application has been developed to provide a method of repairing damage to a fuselage barrel having a one-piece construction that overcomes at least some of the above-discussed shortcomings of prior art techniques. More specifically, in one implementation, in order to utilize the structural and manufacturing efficiencies of a one-piece barrel design, a method is disclosed that helps to ensure that airframes involved in a large scale damage event can be rapidly repaired and returned to service.

Disclosed herein is a method of repairing damage to a fuselage barrel of an aircraft. The fuselage barrel has a one-piece construction. The method includes, prior to damage of the fuselage barrel, determining at least a first virtual splice line and a second virtual splice line along the fuselage barrel in a direction parallel to a longitudinal axis of the fuselage barrel. The method also includes detecting damage in a first section of the fuselage barrel between the first virtual splice line and the second virtual splice line. The method further includes cutting through the fuselage barrel along the first virtual splice line and the second virtual splice line to physically separate the first section from a main section of the fuselage barrel. The method also includes removing the first section from the main section of the fuselage barrel. The method additionally includes splicing a new section to the main section of the fuselage barrel in place of the first section. The preceding subject matter of this paragraph characterizes example 1 of the present disclosure.

The fuselage barrel extends longitudinally along the longitudinal axis from a first end to a second end. The first virtual splice line and the second virtual splice line both extend from the first end of the fuselage barrel to the second end of the fuselage barrel. The preceding subject matter of this paragraph characterizes example 2 of the present disclosure, wherein example 2 also includes the subject matter according to example 1, above.

Splicing the new section to the main section of the fuselage barrel includes forming a first butt joint, along the first virtual splice line, and a second butt joint, along the second virtual splice line, parallel to the longitudinal axis, between the new section and the main section of the fuselage barrel. The preceding subject matter of this paragraph characterizes example 3 of the present disclosure, wherein example 3 also includes the subject matter according to any one of examples 1 or 2, above.

Splicing the new section to the main section of the fuselage barrel further includes overlaying the first butt joint with a first splice plate, overlaying the second butt joint with a second splice plate, and fastening the first splice plate and the second splice plate to an interior surface of the main section of the fuselage barrel and an interior surface of the new section. The preceding subject matter of this paragraph characterizes example 4 of the present disclosure, wherein example 4 also includes the subject matter according to example 3, above.

Removing the first section from the main section of the fuselage barrel includes decoupling a frame element, extending circumferentially about the fuselage barrel, from a first shear tie coupled to the fuselage barrel over the first virtual splice line and from a second shear tie coupled to the fuselage barrel over the second virtual splice line, decoupling the first shear tie from the fuselage barrel, and decoupling the second shear tie from the fuselage barrel. Splicing the new section to the main section of the fuselage barrel includes coupling a first replacement shear tie to the first splice plate, wherein the first replacement shear tie is configured differently than the first shear tie, coupling a second replacement shear tie to the second splice plate, wherein the second replacement shear tie is configured differently than the second shear tie, and coupling the frame element to the first replacement shear tie and the second replacement shear tie. The preceding subject matter of this paragraph characterizes example 5 of the present disclosure, wherein example 5 also includes the subject matter according to example 4, above.

The first splice plate includes multiple first splice plate segments arranged substantially end-to-end along the first butt joint. The second splice plate includes multiple second splice plate segments arranged substantially end-to-end along the second butt joint. Splicing the new section to the main section of the fuselage barrel further includes intercoupling adjacent first splice plate segments with at least one coupler fixed to and spanning at least portions of the adjacent first splice plate segments. Splicing the new section to the main section of the fuselage barrel further comprises intercoupling adjacent second splice plate segments with at least one coupler fixed to and spanning at least portions of the adjacent second splice plate segments. The preceding subject matter of this paragraph characterizes example 6 of the present disclosure, wherein example 6 also includes the subject matter according to any one of examples 4 or 5, above.

A plurality of stringers, circumferentially spaced apart from each other and extending along the fuselage barrel parallel to the longitudinal axis of the fuselage barrel, are coupled to the fuselage barrel. The plurality of stringers are grouped into at least a first pair of stringers, including a first stringer, and a second pair of stringers, including a third stringer. The first virtual splice line extends between the first pair of stringers. The second virtual splice line extends between the second pair of stringers. The preceding subject matter of this paragraph characterizes example 7 of the present disclosure, wherein example 7 also includes the subject matter according to any one of examples 4-6, above.

Splicing the new section to the main section of the fuselage barrel includes positioning a first filler between the first splice plate and the first butt joint and between the first stringer and a second stringer of the new section, and positioning a second filler between the second splice plate and the second butt joint and between the third stringer and a fourth stringer of the new section. The preceding subject matter of this paragraph characterizes example 8 of the present disclosure, wherein example 8 also includes the subject matter according to example 7, above.

The fuselage barrel, first splice plate, second splice plate, and plurality of stringers are made from a fiber-reinforced polymer. The preceding subject matter of this paragraph characterizes example 9 of the present disclosure, wherein example 9 also includes the subject matter according to any one of examples 7 or 8, above.

The aircraft includes multiple fuselage barrels coupled to each other in an end-to-end manner to form a fuselage of the aircraft. Removing the first section from the main section of the fuselage barrel includes decoupling the first section of the fuselage barrel from adjacent fuselage barrels. Splicing the new section to the main section of the fuselage barrel includes coupling the new section to adjacent fuselage barrels. The preceding subject matter of this paragraph characterizes example 10 of the present disclosure, wherein example 10 also includes the subject matter according to any one of examples 1-9, above.

The new section is pre-manufactured, prior to damage of the fuselage barrel, responsive to a location on the fuselage barrel of the first virtual splice line and the second virtual splice line. The preceding subject matter of this paragraph characterizes example 11 of the present disclosure, wherein example 11 also includes the subject matter according to any one of examples 1-10, above.

Determining at least the first virtual splice line and the second virtual splice line includes detecting a path along an interior surface of the fuselage barrel having a line of sight from one end of the path to an opposite end of the path, and locating one of the first virtual splice line and the second virtual splice line along the path. The preceding subject matter of this paragraph characterizes example 12 of the present disclosure, wherein example 12 also includes the subject matter according to any one of examples 1-11, above.

Each of the first section and the new section forms at least a quarter of the fuselage barrel. The preceding subject matter of this paragraph characterizes example 13 of the present disclosure, wherein example 13 also includes the subject matter according to any one of examples 1-12, above.

The method further includes, prior to damage of the fuselage barrel, determining at least a third virtual splice line along the fuselage barrel in a direction parallel to a longitudinal axis of the fuselage barrel. The preceding subject matter of this paragraph characterizes example 14 of the present disclosure, wherein example 14 also includes the subject matter according to any one of examples 1-13, above.

Also disclosed is a fuselage barrel assembly of an aircraft. The fuselage barrel assembly includes a main section of a fuselage barrel having a one-piece construction. The fuselage barrel assembly also includes a new section of the fuselage barrel having a one-piece construction and spliced to the main section along a first butt joint between the main section and the new section and along a second butt joint between the main section and the new section. The fuselage barrel assembly further includes a first splice plate fastened to the main section of the fuselage barrel and the new section over the first butt joint, and a second splice plate fastened to the main section of the fuselage barrel and the new section over the second butt joint. The fuselage barrel assembly additionally includes a first replacement shear tie coupled to the first splice plate, a second replacement shear tie coupled to the second splice plate, and a frame element coupled to both the first replacement shear tie and the second replacement shear tie. The preceding subject matter of this paragraph characterizes example 15 of the present disclosure.

The main section includes a first stringer, extending parallel to the first butt joint, and a second stringer, extending parallel to the second butt joint. The new section includes a third stringer, extending parallel to the first butt joint, and a fourth stringer, extending parallel to the second butt joint. The fuselage barrel further includes a first filler between the first splice plate and the first butt joint and between the first stringer and the third stringer, and a second filler between the second splice plate and the second butt joint and between the second stringer and the fourth stringer. The preceding subject matter of this paragraph characterizes example 16 of the present disclosure, wherein example 16 also includes the subject matter according to example 15, above.

The main section includes a first stringer, extending parallel to the first butt joint, and a second stringer, extending parallel to the second butt joint. The new section includes a third stringer, extending parallel to the first butt joint, and a fourth stringer, extending parallel to the second butt joint. The first splice plate is supported on and fastened to the first stringer, the third stringer, and the first filler. The second splice plate is supported on and fastened to the second stringer, the fourth stringer, and the second filler. The preceding subject matter of this paragraph characterizes example 17 of the present disclosure, wherein example 17 also includes the subject matter according to example 16, above.

The first butt joint and the second butt joint are circumferentially spaced apart from each other. The first butt joint and the second butt joint extend parallel to a longitudinal axis of the fuselage barrel. The first butt joint and the second butt joint extend from a first end of the fuselage barrel to a second end of the fuselage barrel. The preceding subject matter of this paragraph characterizes example 18 of the present disclosure, wherein example 18 also includes the subject matter according to any one of examples 15-17, above.

The main section, new section, first splice plate, and second splice plate is made from a fiber-reinforced polymer. The preceding subject matter of this paragraph characterizes example 19 of the present disclosure, wherein example 19 also includes the subject matter according to any one of examples 15-18, above.

An aircraft is disclosed. The aircraft includes a plurality of fuselage barrel assemblies interconnected to each other. At least one of the fuselage barrel assemblies includes a main section of a fuselage barrel having a one-piece construction. At least the one of the fuselage barrel assemblies also includes a new section of the fuselage barrel having a one-piece construction and spliced to the main section along a first butt joint between the main section and the new section and along a second butt joint between the main section and the new section. At least the one of the fuselage barrel assemblies additionally includes a first splice plate fastened to the main section of the fuselage barrel the new section over the first butt joint, and a second splice plate fastened to the main section of the fuselage barrel and the new section over the second butt joint. At least the one of the fuselage barrel assemblies further includes a first replacement shear tie coupled to the first splice plate, a second replacement shear tie coupled to the second splice plate, and a frame element coupled to both the first replacement shear tie and the second replacement shear tie. The plurality of fuselage barrel assemblies are interconnected in an end-to-end configuration at abutting ends of respective fuselage barrels of the fuselage barrel assemblies. The preceding subject matter of this paragraph characterizes example 20 of the present disclosure.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
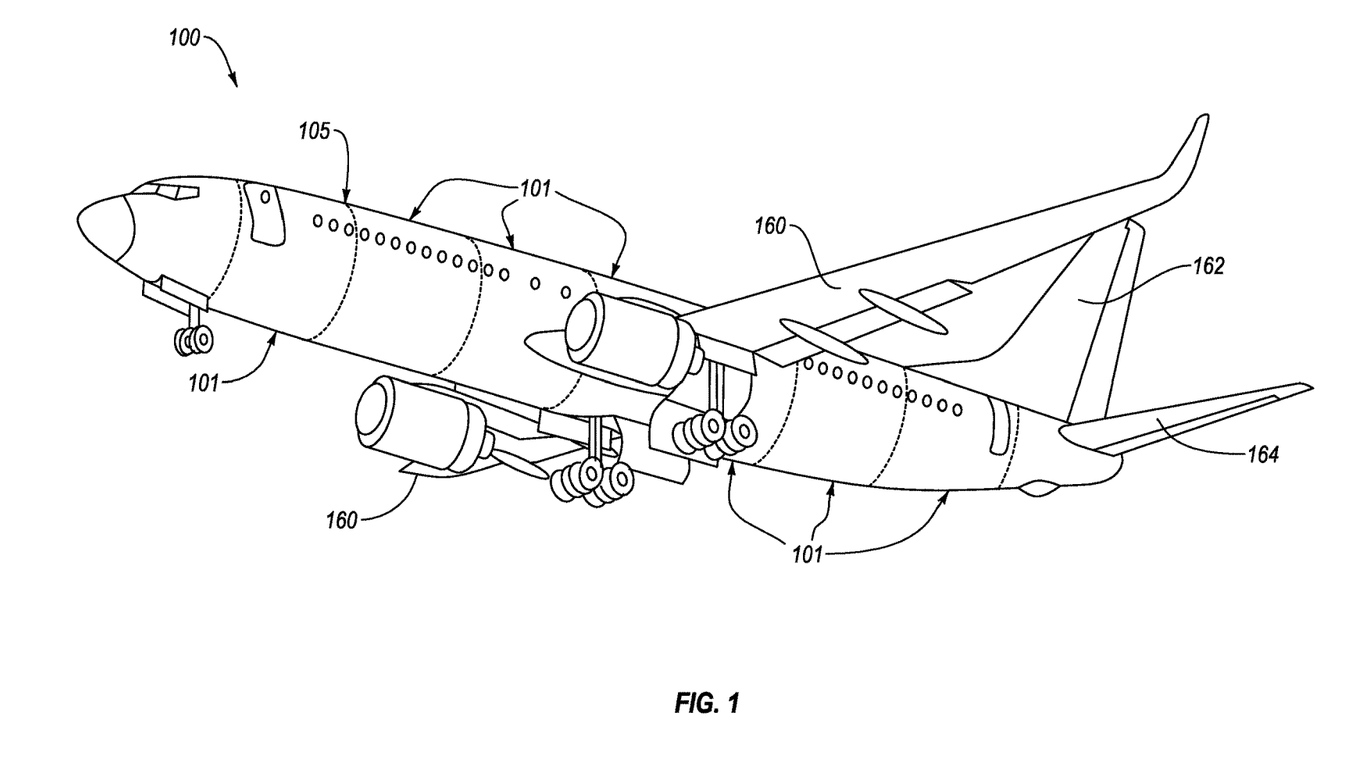
FIG. 1 is a perspective view of an aircraft with multiple fuselage barrel assemblies, according to one or more embodiments of the present disclosure.

Referring to FIG. 1, one embodiment of an aircraft 100 is shown. The aircraft 100 is a mobile complex structure. In some implementations, the aircraft 100 can be any of various other mobile complex structures, such as a vehicle (e.g., watercraft, rocket, automobile, etc.) or a stationary complex structure (e.g., a factory, building, machinery, etc.). The aircraft 100 includes a fuselage 105, a pair of wings 160 coupled to and extending from the fuselage 105, a vertical stabilizer 162 coupled to and extending from the fuselage 105, and a pair of horizontal stabilizers 164 coupled to and extending from the fuselage 105 or the vertical stabilizer 162. The aircraft 100 includes features representative of a commercial passenger or military transport aircraft. However, the aircraft 100 can be any of various other types of commercial or non-commercial aircraft, such as personal aircraft, fighter jets, helicopters, spacecraft, and the like.

Figure 2:
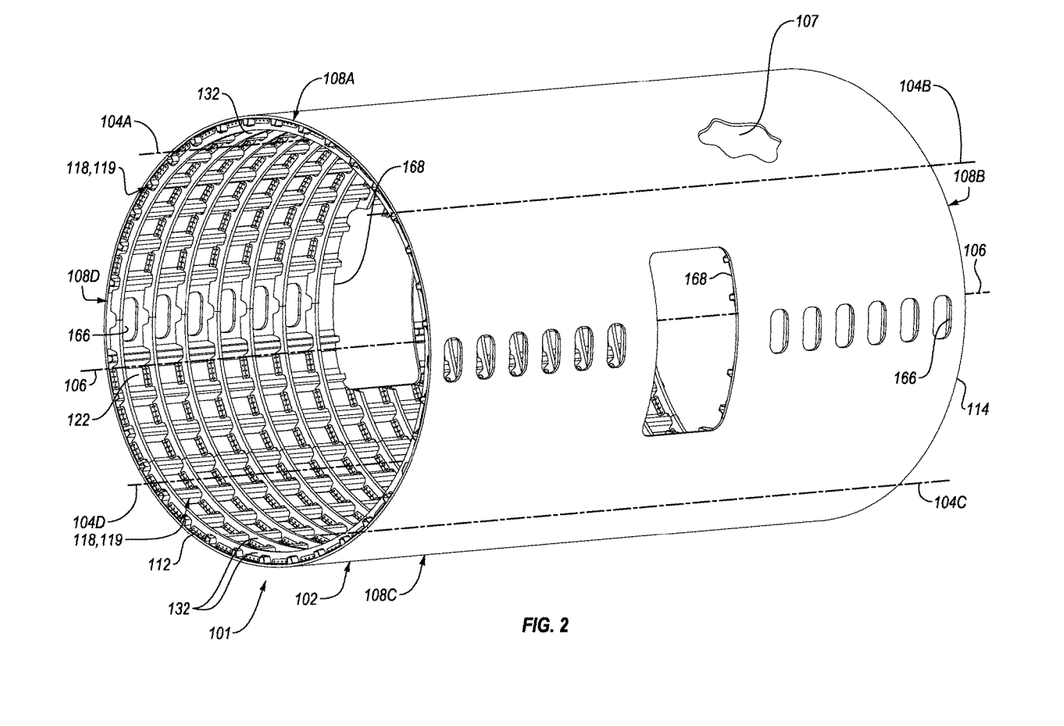
FIG. 2 is a perspective view of a fuselage barrel assembly with virtual splice lines, according to one or more embodiments of the present disclosure.

The fuselage 105 of the aircraft 100 includes a plurality of fuselage barrel assemblies 101 interconnected to each other to form the fuselage 105. As shown in FIG. 2, each fuselage barrel assembly 101 includes a fuselage barrel 102. The fuselage barrel 102 has a hollow and elongate tubular construction. For example, the fuselage barrel 102 extends lengthwise along a longitudinal axis 106, which defines a central axis of the fuselage barrel 102, from a first end 112 of the fuselage barrel 102 to a second end 114 of the fuselage barrel 102. The cross-sectional shape of the fuselage barrel 102 along a plane perpendicular to the longitudinal axis 106 is generally a circular or an annular ring.

The fuselage barrel 102 is formed as one-piece, monolithic, construction. In other words, the fuselage barrel 102 is seamless and does not include components that are separately formed and then assembled or joined together. Rather, the entire fuselage barrel 102 is formed as one-piece during the same manufacturing process. In some implementations, the fuselage barrel 102 is made from a fiber-reinforced polymer (e.g., carbon-fiber-reinforced polymer). For example, the fuselage barrel 102 can be formed from a continuous length of fiber that is spun, along with uncured resin or epoxy, into the shape of the fuselage barrel 102 and cured. After the fuselage barrel 102 is cured, features, such as window openings 166 and doorways 168, can be formed into the fuselage barrel 102 by cutting and removing corresponding portions of the cured fuselage barrel 102.

The fuselage 105 of the aircraft 100 is formed by interconnecting the plurality of fuselage barrel assemblies 101 in an end-to-end manner. Moreover, the fuselage barrel assemblies 101 are removably interconnected to each other by interconnecting respective first ends 112 and second ends 114 of adjacent fuselage barrels 102. Generally, the first end 112 and second end 114 of adjacent fuselage barrels 102 together form a production splice (e.g., seam) of the fuselage 105, such that the fuselage 105 includes multiple production splices. The first end 112 and second end 114 of adjacent fuselage barrels 102 can be removably interconnected using any of various coupling techniques, such as lap joints or butt joints that are reinforced with splicing elements. In some implementations, the first end 112 and second end 114 of adjacent fuselage barrels 102 can be removably interconnected using a bulkhead or similar interconnecting element. The first end 112 and second end 114 can be removably interconnected by using fasteners that are tightenable to interconnect together the first end 112 and second end 114 and loosenable to disconnect the first end 112 and second end 114 from each other.

Figure 9:
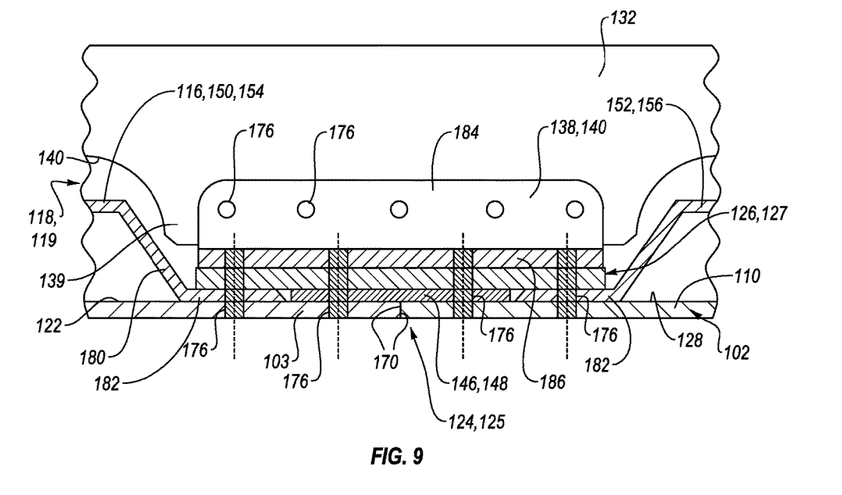
FIG. 9 is a side elevation view of a new section of a fuselage barrel coupled to a main section of the fuselage barrel, shown with a replacement shear tie and frame element, according to one or more embodiments of the present disclosure.

Referring still to FIG. 2, each fuselage barrel assembly 101 includes a plurality of stringers 116 that are circumferentially spaced apart from each other about an interior surface 122 of the fuselage barrel 102. Moreover, the plurality of stringers 116 extend along the interior surface 122 of the fuselage barrel 102 in a direction parallel to the longitudinal axis 106 of the fuselage barrel 102. The stringers 116 can extend an entire length of the fuselage barrel 102 from the first end 112 to the second end 114. The stringers 116 are coupled to the interior surface 122 of the fuselage barrel 102 and promote structural rigidity of the fuselage barrel 102. As shown in FIG. 9, each stringer 116 includes a hat portion 180 (e.g., raised portion) and flanges 182 extending from opposite sides of the hat portion 180. The flanges 182 are coupled directly to the interior surface 122 of the fuselage barrel 102. In some implementations, the stringers 116 are made from a fiber-reinforced polymer and co-cured with the fuselage barrel 102 to couple the flanges 182 to the interior surface 122 of the fuselage barrel 102.

Each fuselage barrel assembly 101 further includes a plurality of shear ties, such as first shear tie 134 and second shear tie 136, removably coupled to the interior surface 122 of the fuselage barrel 102. Referring to FIG. 9, each shear tie includes an upright portion 184 and flanges 186 extending perpendicularly relative to the upright portion 184. The flanges 186 of each shear tie are substantially parallel to the interior surface 122 of the fuselage barrel 102 and the upright portion 184 of each shear tie is perpendicular to the interior surface 122 of the fuselage barrel 102. In one implementation, each shear tie is removably coupled to the interior surface 122 of the fuselage barrel 102, between a respective pair of stringers 116, via one or more fasteners 176 that extend through the flanges 186 and at least partially into the fuselage barrel 102. As shown in FIG. 9, the shear ties can be configured such that they extend from stringer to stringer of a respective pair of stringers 116. In such an implementation, each shear tie may rest on the flanges 182 of the pair of stringers 116 and one or more fasteners 176 may extend through the flanges 186 of the shear tie and flanges 182 of the pair of stringers 116 and at least partially into the fuselage barrel 102 to removably couple the shear tie to the interior surface 122 of the fuselage barrel 102. Although two rows of fasteners 176 are shown on each side of the splice line, defined by the edges 170, more or less than two rows of fasteners 176 (e.g., three rows of fasteners 176) may be used on each side of the splice line.

Additionally, each fuselage barrel 102 includes a plurality of frame elements 132 each removably coupled, such as via fasteners 176, to the upright portions 184 of shear ties that are circumferentially aligned along a circumference of the fuselage barrel 102. When removably coupled to the shear ties, the frame elements 132 promote structural rigidity of the fuselage barrel 102 by preventing ballooning of the fuselage barrel 102. Each frame element 132 is an at least partially annular plate with a curvature complementing the curvature of the interior surface 122 of the fuselage barrel 102. In some implementations, at least one of the frame elements 132 extends along at least a quarter of the circumference of the interior surface 122 of the fuselage barrel 102. In certain implementations, multiple frame elements 132 can be circumferentially aligned to effectively or cooperatively extend along an entirety or a majority of the circumference of the interior surface 122 of the fuselage barrel 102. According to one implementation, at least one of the frame elements 132 extends along an entirety of the circumference of the interior surface 122 of the fuselage barrel 102. The frame element 132 includes a plurality of tabs 139 and notches 141 between the tabs 139. The tabs 139 receive the fasteners 176 that couple the frame element 132 to the shear ties. In contrast, the notches 141 defines a space into which the hat portion 180 of a stringer 116 may extend. In this manner, the frame elements 132 are indirectly coupled to the fuselage barrel 102 via the shear ties.

After each of the fuselage barrel assemblies 101 are assembled and coupled together to form the fuselage 105 of the aircraft 100, the further assembly, testing, and/or manufacturing process can be performed to ready the aircraft 100 for operation. Prior to operation of the aircraft 100, virtual splice lines along the fuselage barrel 102, in a direction parallel to the longitudinal axis 106 of the fuselage barrel 102, are determined. Referring to FIG. 2, representations of four virtual splice lines (e.g., first virtual splice line 104A, second virtual splice line 104B, third virtual splice line 104C, and fourth virtual splice line 104D) are shown. Although four virtual splice lines are shown, more than four virtual splice lines can be determined prior to operation of the aircraft 100. As defined herein, a virtual splice line can be considered a pre-defined splice or a splice that is modeled in virtual space as a provision for a possible future repair.

The circumferential location and quantity of the virtual splice lines on the fuselage barrel 102 can be determined as the aircraft 100 is designed and before assembly of the aircraft 100, during assembly of the aircraft 100, or after the aircraft 100 is assembled. Determination of the quantity and circumferential location of the virtual splice lines can be dependent on a variety of factors.

The location and quantity of the virtual splice lines can be based on the ease of cutting through the fuselage barrel 102 without obstruction from other features of or objects coupled to the fuselage barrel 102. For example, in one implementation, at least one of the virtual splice lines is located along a path along the interior surface 122 of the fuselage barrel 102 that has a line of sight from one end of the path (e.g., the first end 112 of the fuselage barrel 102) to an opposite end of the path (e.g., the second end 114 of the fuselage barrel 102). In another example, at least one of the virtual splice lines is located along a path along the interior surface 122 of the fuselage barrel 102 that passes through the fewest features of the fuselage barrel 102 or objects coupled to the fuselage barrel 102. According to one implementation, at least one of the virtual splice lines extends parallel to and between a pair of stringers (e.g., pair of stringers 118 and pair of stringers 119), of the plurality of stringers 116, to limit the number of obstructions through which the virtual splice line passes through. Although at least a portion of each virtual splice line extends parallel to the longitudinal axis 106, in some implementations, a portion of at least one virtual splice line may extend diagonally or perpendicularly relative to the longitudinal axis 106 (e.g., circumferentially) to avoid objects or where damage 107 to the aircraft 100 is minimal.

In some implementations, the location and quantity of the virtual splice lines can be based on a desired size and/or quantity of new sections 110 that are pre-manufactured or available prior to damage of the fuselage barrel 102 of the aircraft 100. As defined herein, a new section 110 can be pre-manufactured by using a process that is qualified to be equivalent to the process for manufacturing the fuselage barrel 102 or excising the new section 110 from another (e.g., spare) fuselage barrel 102. For example, where new sections 110 include only quarter sections of the fuselage barrel 102, there may be four virtual splice lines an equidistance apart from each other to divide the fuselage barrel 102 into four equally sized sections. As shown in FIG. 2, the fuselage barrel 102 includes four virtual splice lines (e.g., first virtual splice line 104A, second virtual splice line 104B, third virtual splice line 104C, and fourth virtual splice line 104D) that divide up the fuselage barrel 102 into four sections (e.g., first section 108A, second section 108B, third section 108C, and fourth section 108D).

In certain implementations, the location and quantity of the virtual splice lines are determined automatically by a computing apparatus. The computing apparatus can receive inputs regarding the designed configuration of the fuselage barrel assembly 101, as well as any of various user-specified inputs, such as a desired one of the above-mentioned or other approaches for determining the virtual splice lines. Then, based on the inputs, the computing apparatus determines the location and quantity of the virtual splice lines before damage 107 to the fuselage barrel 102 in operation or before/during assembly of the fuselage barrel 102 and fuselage barrel assembly 101. The computing apparatus can be any of various computing devices known in the art.

After the virtual splice lines are determined, the aircraft 100 can be operated as desired. Should damage 107 occur to the fuselage barrel 102 of a fuselage barrel assembly 101 during operation, the section of the fuselage barrel 102 in which the damage 107 occurs is determined after the damage 107 is detected. In some implementations, the section of the fuselage barrel 102 in which the entirety of the damage 107 occurs is determined. In some implementations, if damage 107 extends across a virtual splice line into two sections of the fuselage barrel 102, other predetermined, alternative, splice lines can be used to determine an alternative section of the fuselage barrel 102 in which the entirety of the damage 107 occurs.

Figure 3:
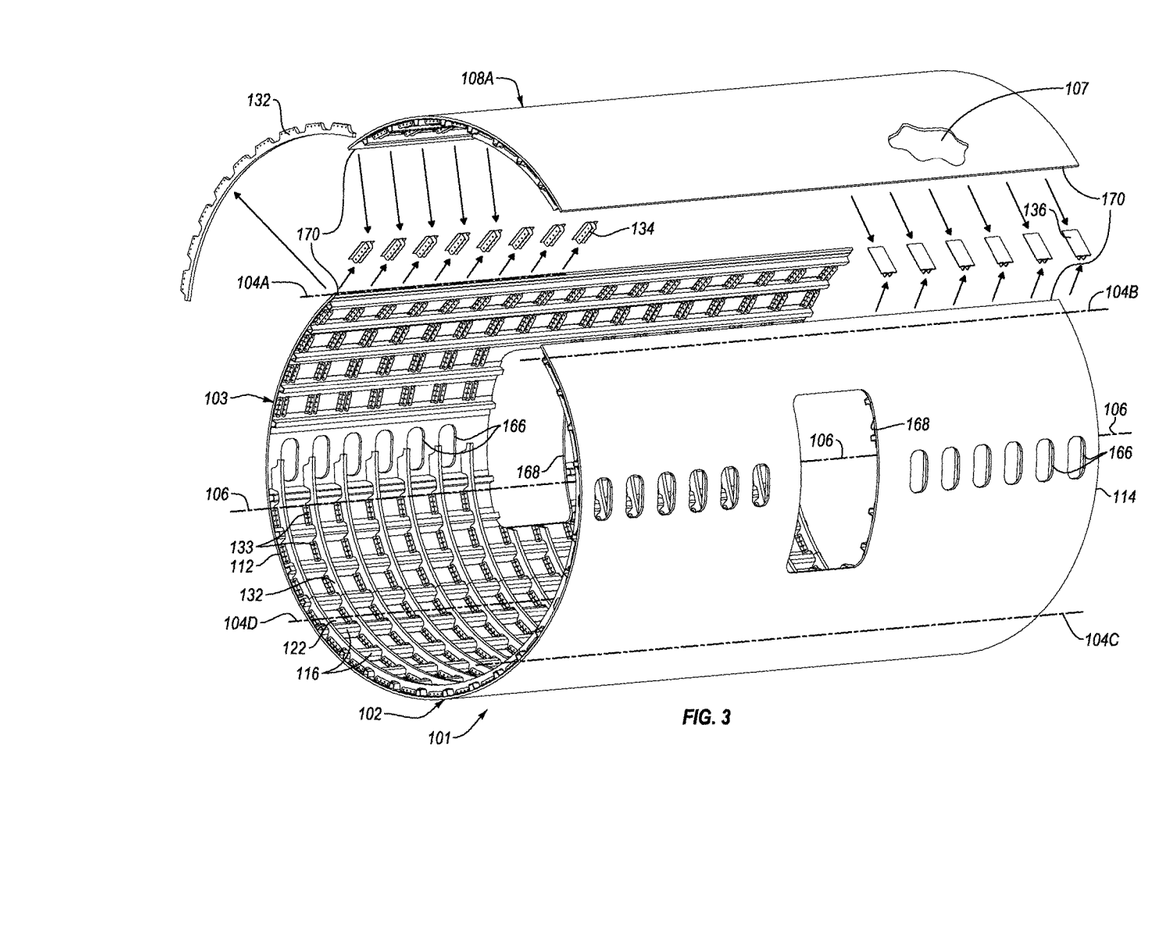
FIG. 3 is a perspective view of a first section of a fuselage barrel removed from a main section of the fuselage barrel, according to one or more embodiments of the present disclosure.

After the section of the fuselage barrel 102 with the damage 107 is determined, the fuselage barrel 102 is cut along the virtual splice lines, defining the section of the fuselage barrel 102, to physically separate the section of the fuselage barrel 102 from a main or remaining section of the fuselage barrel 102. For example, as shown in FIG. 3, the first section 108A, which includes the entirety of the damage 107, is separated from the main section 103 of the fuselage barrel 102 by cutting along the first virtual splice line 104A and the second virtual splice line 104B. Also, in some embodiments, the first section 108A would be disconnected from adjacent fuselage assemblies 101 while the main section 103 remains connected to adjacent fuselage assemblies 101. Generally, the entire first section 108A is removed even if the damage 107 occupies only a small percentage of the first section 108A. As defined herein, the main section 103 of the fuselage barrel 102 is the section of the fuselage barrel 102 that remains after the section of the fuselage barrel 102 with the damage 107 is removed.

Before the section of the fuselage barrel 102 with the damage 107 is removed from the main section of the fuselage barrel, and before or after the fuselage barrel 102 is cut along the splice lines, the fuselage barrel assembly 101 is at least partially disassembled in preparation for removing the section with the damage 107. For example, referring again to FIG. 3, the frame elements 132 and the respective shear ties 134, 136 spanning the first and second virtual splice lines 104A, 104B are removed from the fuselage barrel 102 before the first section 108A is removed from the main section 103. Removal of the frame elements 132 and shear ties 134, 136 can be accomplished by loosening and removing the fasteners 176 coupling together the shear ties 134, 136 and the fuselage barrel 102 and, in some implementations, the fasteners 176 coupling together the frame elements 132 and the shear ties 134, 136. However, in some implementations, the shear ties 134, 136 are formed integrally (e.g., co-cured) with the frame elements 132, such that removal of the shear ties 134, 136 from the frame elements 132 includes trimming, shearing, or cutting the shear ties 134, 136 from the frame elements 132. Also, in certain implementations, such as where the shear ties 134, 136 are non-removably coupled to the fuselage barrel 102 (e.g., being flush against and adhered or bonded to the interior surface 122 of the fuselage barrel 102), removal of the shear ties 134, 136 from the fuselage barrel 102 may include trimming, shearing, or cutting the shear ties 134, 136 from the fuselage barrel 102. It is noted that in FIG. 3 only one of the multiple frame elements 132 and only some of the shear ties 134, 136 are shown being removed from the fuselage barrel 102 for clarity in showing other features of the fuselage barrel assembly 101.

Figure 4:
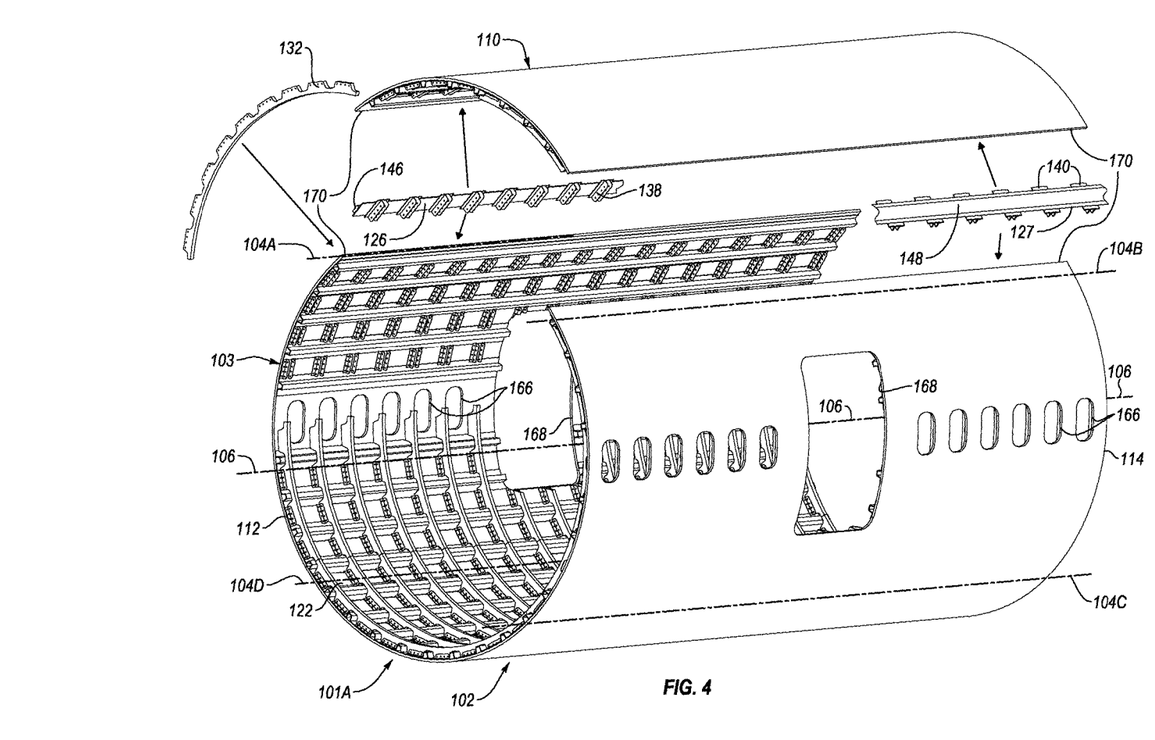
FIG. 4 is a perspective view of a new section of a fuselage barrel being coupled to a main section of the fuselage barrel, according to one or more embodiments of the present disclosure.

As shown in FIG. 4, after the first section 108A of the fuselage barrel 102 is removed from the main section 103 of the fuselage barrel 102, a new section 110 is spliced to the main section 103 in place of the first section 108A to create a repaired fuselage barrel assembly 101A. The new section 110 is configured the same as the first section 108A. For example, the new section 110 has the same size and shape as the first section 108A. Additionally, the new section 110 is made from the same material as the first section 108A, which, in some implementations, is a fiber-reinforced polymer. Moreover, in certain implementations, the new section 110 is made before the damage 107 occurs to the first section 108A. In other words, the new section 110 is made to match the first section 108A after the first and second virtual splice lines 104A, 104B are determined, but before any damage occurs to the first section 108A. However, in other implementations, the new section 110 is made to match the first section 108A after the first and second virtual splice lines 104A, 104B are determined and after the damage 107 occurs to the first section 108A.

Figure 8:
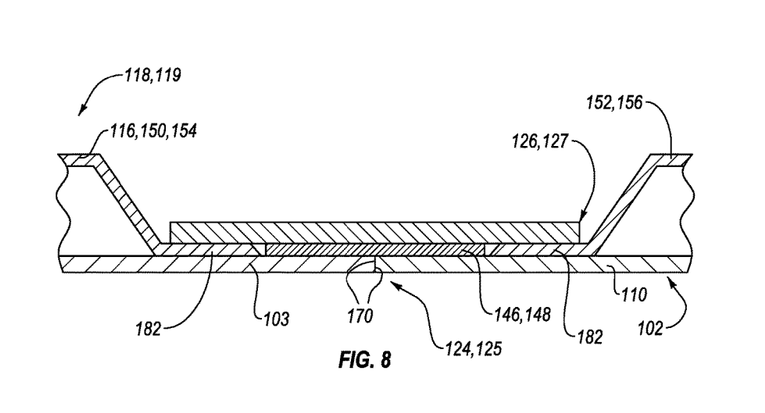
FIG. 8 is a side elevation view of a new section of a fuselage barrel coupled to a main section of the fuselage barrel, shown without a replacement shear tie and frame element, according to one or more embodiments of the present disclosure.

The new section 110 is spliced to the main section 103 by constructing, between the new section 110 and the main section 103, a first butt joint 124 along the first virtual splice line 104A and a second butt joint 125 along the second virtual splice line 104B. At least a portion of, or an entirety of, in some implementations, the first butt joint 124 and the second butt joint 125 extends parallel to the longitudinal axis 106. As shown in FIGS. 8 and 9 any one of the first butt joint 124 and the second butt joint 125 is formed by locating the new section 110 relative to the main section 103 such that edges 170 of the new section 110 and the main section 103, between the first and second ends 112, 114 of the fuselage barrel 102, substantially abut, or are directly adjacent, each other. In other words, no portion of the new section 110 and the main section 103 overlap with each other at the first butt joint 124 and the second butt joint 125.

Referring to FIGS. 4-7, the first butt joint 124 and the second butt joint 125 are reinforced by coupling together the new section 110 and the main section 103 with respective first and second splice plates 126, 127 that overlay the first butt joint 124 and the second butt joint 125, respectively. Referring again to FIGS. 8 and 9, a portion of the first and second splice plates 126, 127 is fixed to the new section 110 and another portion of the first and second splice plates 126, 127 is fixed to the main section 103. Accordingly, the first splice plate 126, when fixed to the new section 110 and the main section 103, spans across the first butt joint 124 and the second splice plate 127, when fixed to the new section 110 and the main section 103, spans across the second butt joint 125. In some implementations, the first and second splice plates 126, 127 sit flush against the interior surfaces 122, 128 of the main section 103 and the new section 110, interposed between the first and second stringers 150, 152 and the third and fourth stringers 154, 156, respectively, such that the first and second splice plates 126, 127 contact and are directly coupled to the interior surfaces 122, 128. However, in alternative implementations, such as shown in FIGS. 8 and 9, the first and second splice plates 126, 127 sit flush against the flanges 182 of the first and second stringers 150, 152 and the third and fourth stringers 154, 156, respectively, such that a gap exists between the interior surfaces 122, 128 of the main section 103 and the new section 110. The gap can be filled with a filler, such as a respective one of first and second fillers 146, 148. Each of the first and second fillers 146, 148 can be made from any of various materials, such as, for example, a fiber-reinforced polymer, polymer, metal, and/or the like. Alternatively, in certain implementations, each shear tie may rest directly on the interior surfaces 122, 128 of the fuselage barrel 102, without a filler.

The first and second splice plates 126, 127 can be fixed to the main section 103 and new section 110 using fasteners, such as the same fasteners 176, or similar fasteners, used to fix the first and second shear ties 134, 136 to the fuselage barrel 102. The fasteners 176 extend through the first and second splice plates 126, 127, through the flanges 182 of the stringers and/or fillers in some implementations, and into one of the main section 103 and new section 110. When fixed to the main section 103 and new section 110 over the first and second butt joints 124, 125, the respective first and second splice plates 126, 127 facilitate the transfer of pressure loads across the first and second butt joints 124, 125 and help to promote load continuity in the fuselage barrel 102 in the circumferential or a hoopwise direction.

The first and second splice plates 126, 127 each has a width greater than a thickness, and a length greater than the width. Moreover, the first and second splice plates 126, 127 are made from the same material as the main section 103 and new section 110 of the fuselage barrel 102. For example, the first and second splice plates 126, 127 can be made from a fiber-reinforced polymer. The matrix of the fiber-reinforced polymer of the first and second splice plates 126, 127 is cured prior to fixing the first and second splice plates to the main section 103 and new section 110.

Figure 5:
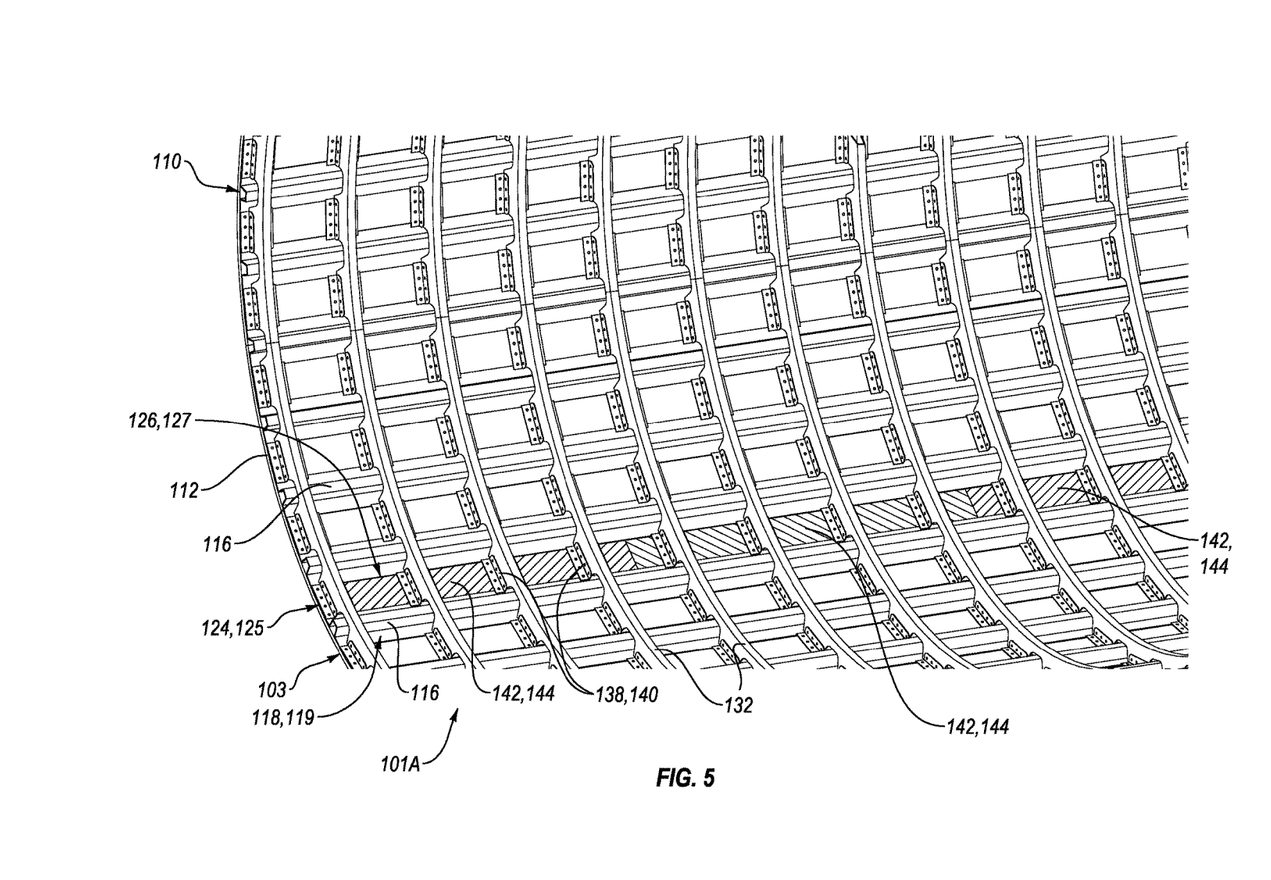
FIG. 5 is a perspective view of a new section of a fuselage barrel coupled to a main section of the fuselage barrel, according to one or more embodiments of the present disclosure.

In some implementations, each of the first and second splice plates 126, 127 is a continuous, one-piece and non-segmented, plate that extends from a first end of the respective first and second butt joints 124, 125 (e.g., at the first end 112 of the fuselage barrel 102) to a second end of the respective first and second butt joints 124, 125 (e.g., at the second end 114 of the fuselage barrel 102). However, as shown in FIG. 5, each of the first and second splice plates 126, 127 can be segmented into multiple, interconnected, first and second splice plate segments 142, 144, respectively. Generally, the first splice plate segments 142 overlay the first butt joint 124 in an end-to-end manner longitudinally along the first butt joint 124, and the second splice plate segments 144 overlay the second butt joint 126 in an end-to-end manner longitudinally along the second butt joint 126. Segmenting the first and second splice plates 126, 127 into multiple first and second splice plate segments 142, 144 promotes tolerance to damage of the first and second splice plates 126, 127 by ensuring that damage to one splice plate segment does not impact the performance of the other splice plate segments and thus the performance of the splice plate as a whole. To facilitate load continuity in the fuselage barrel 102 in a fore-aft or longitudinal direction, one or more couplers 130 fixed to and spanning at least portions of adjacent splice plate segments forming the splice plates. In other words, the coupler 130 effectively splices together the splice plate segments of a given splice plate. The coupler 130 can be any of various couplers, such as plates, brackets, shear ties, and the like. Moreover, the coupler 130 can be fixed to the splice plate segments via any of various techniques, such as fasteners, bonding, and the like.

Referring to FIG. 9, splicing the new section 110 to the main section 103 also includes fixing replacement shear ties, such as first and second replacement shear ties 138, 140, to the first and second splice plates 126, 127, respectively. The replacement shear ties 138, 140 can be fixed to the first and second splice plates 126, 127 by fasteners, such as fasteners 176, that extend through flanges 186 of each replacement shear tie 138, 140. Like the first and second shear ties 134, 136, the replacement shear ties 138, 140 includes flanges 186 and an upright 184 extending transversely from the flanges 186. However, because the replacement shear ties 138, 140 are fixed to the first and second splice plates 126, 127, and the shear ties 134, 136 are fixed to the flanges of the stringers or the interior surface of the fuselage barrel 102, the replacement shear ties 138, 140 are located more radially inwardly than the shear ties 134, 136. Accordingly, to ensure the radial location of the frame elements 132 remains unchanged, the replacement shear ties 138, 140 are configured differently than the shear ties 134, 136. More specifically, in some implementations, apertures, for receiving fasteners 176 to fix a frame element 132, in the upright portion 184 of each replacement shear tie 138, 140 are located closer to the flanges 186 than the shear ties 134, 136. Additionally, according to certain implementations, the size of the upright portion 184 of the replacement shear ties 138, 140, may be different (e.g., shorter) than the upright portion 184 of the shear ties 134, 136. The shear ties 134, 136 (e.g., production shear ties) and the replacement shear ties 138, 140 can be made from a fiber-reinforced polymer that is the same as or similar to that of the fuselage barrel 102.

With the replacement shear ties 138, 140 fixed to the first and second splice plates 126, 127, respectively, a frame element 132 can be fixed to the upright portion 184 of each of the replacement shear ties 138, 140. Additionally, each frame element 132 is reattached to the original shear ties 134, 136 secured to the main section 103 of the fuselage barrel 102 and circumferentially aligned with the replacement shear ties 138. Furthermore, although not shown, shear ties 134, 136 are fixed to the new section 110, either before or after the new section 110 forms the first and second butt joints 124, 125 with the main section 103. Each frame element 132 is attached to the shear ties 134, 136 fixed to the new section 110 of the fuselage barrel 102 and circumferentially aligned with the replacement shear ties 138. In some implementations, the frame elements 132 are fixed to the upright portions 184 via one or more fasteners 176. In some implementations, the frame elements 132 are fixed to the replacement shear ties 138, 140 before the replacement shear ties 138, 140 are fixed to the first and second splice plates 126, 127.

Figure 6:
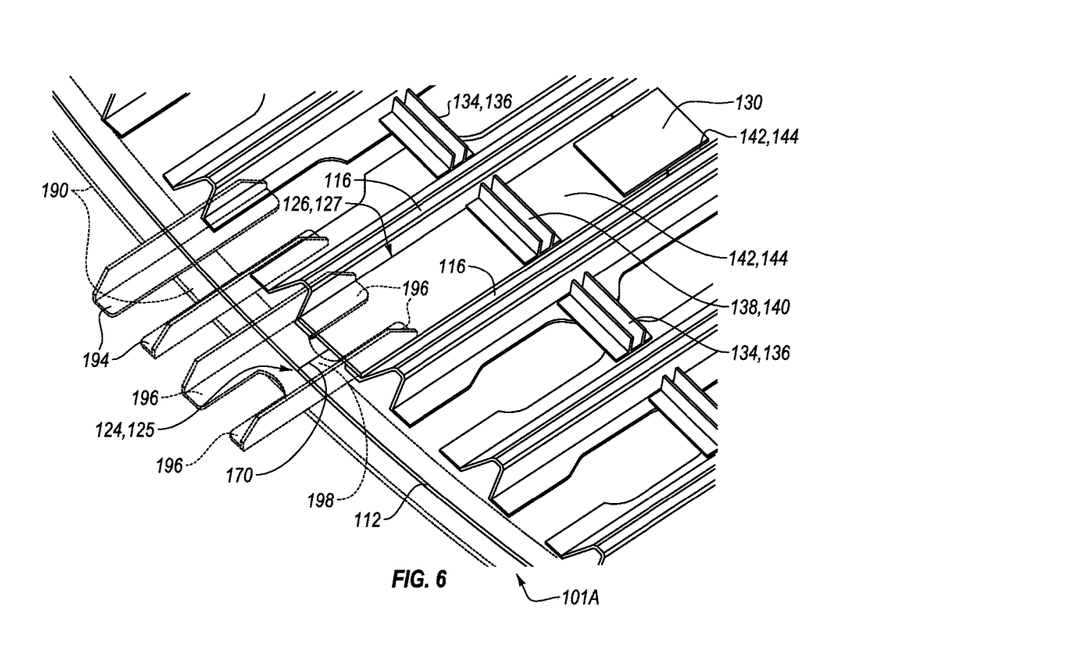
FIG. 6 is a perspective view of a new section of a fuselage barrel coupled to a main section of the fuselage barrel, shown without fasteners, according to one or more embodiments of the present disclosure.
Figure 7:
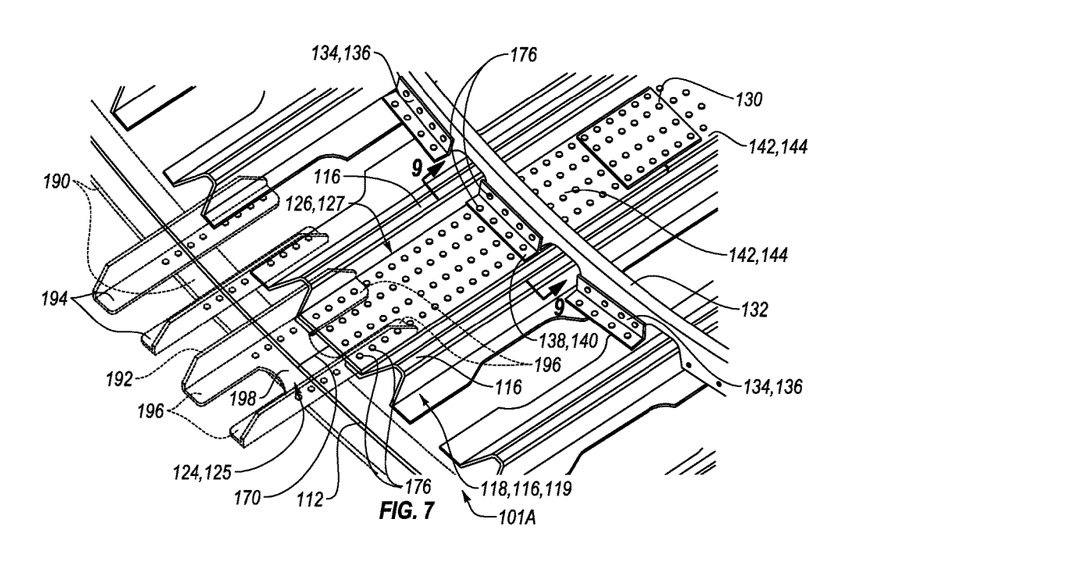
FIG. 7 is a perspective view of a new section of a fuselage barrel coupled to a main section of the fuselage barrel, shown with fasteners, according to one or more embodiments of the present disclosure.

As shown in FIGS. 6 and 7, the new section 110 of the repaired fuselage assembly 101A is reconnected to one or more original or production fuselage assemblies 101 (e.g., the same one or more fuselage assemblies 101 from which the first section 108A was disconnected to perform the repair to the fuselage barrel 102 of the damaged fuselage assembly). Generally, in some embodiments, a hoop strap 190 is used to splice together the ends (e.g., end 112) of fuselage barrels 102 of adjacent fuselage barrel assemblies 101. The hoop strap 190 extends about an interior of the adjacent fuselage barrel assemblies in a circumferential direction that is perpendicular to the longitudinal axis 106. Moreover, the hoop strap 190 spans over the joint between abutting ends of adjacent fuselage barrels in an axial or longitudinal direction perpendicular to the circumferential direction. The hoop strap 190 can be fixed to the adjacent fuselage barrels using any of various fixation elements, such as fasteners 176. In some implementations, the hoop strap 190 includes multiple hoop strap segments arranged in an end-to-end configuration along the joint between abutting ends of adjacent fuselage barrels.

The joint between abutting ends of adjacent fuselage barrels may further include at least one longitudinal member 194 that longitudinally spans over the abutting ends and the hoop strap 190. In some implementations, the longitudinal member 194 can includes two longitudinal portions that extend an angle relative to each other such that the longitudinal member 194 has a substantially L-shaped or V-shaped cross-section. The longitudinal member 194 can be affixed to the flange of a respective one of the stringers 116 on each of the fuselage barrels abutting each other and to the hoop strap 190 using any of various fixation elements, such as fasteners 176. If necessary, footings (not shown) can be positioned between each longitudinal member 194 and the flanges of the stringers 116 to promote proper spacing between the longitudinal member 194 and the flanges of the stringers 116. In some implementations, as shown, two longitudinal members 194 are positioned, in a spaced apart manner from each other, and fixed between each pair of stringers 116. Because the longitudinal members 194 between a pair of stringers 116 are circumferentially spaced apart, such longitudinal members 194 are used with a pair of stringers 116 between which no longitudinal post-production splice line or cut (e.g., edges 170) in the fuselage barrel 102 is present.

For a pair of stringers 116 between which a longitudinal post-production splice line or cut in the fuselage barrel 102 is present, such as with the repaired fuselage assembly 101A, the joint includes an additional fitting or splice plate over the hoop strap 190 between the spaced apart longitudinal members 194. The additional fitting between the longitudinal members 194 spans and is affixed to the hoop strap 190, such as with fasteners 176, which helps to distribute circumferential loads placed on the joint. In some implementations, the two longitudinal members 194 and the additional fitting between the longitudinal members 194 can be consolidated into a single fitting, such as the H-fitting 192. The H-fitting 192 includes two longitudinally straight portions 196 similar to two longitudinal members 194. The two longitudinally straight portions 196 are circumferentially connected by a lateral portion 198 or cross-member, which spans the joint and the hoop strap 190 and helps to distribute circumferential loads between the two longitudinally straight portions 196. Accordingly, in plan view, the H-fitting 192 has a substantially H-shape. The two longitudinally straight portions 196 are affixed to one of the splice plates 126, 127 on one side of the H-fitting 192 and to the flanges (or footings) of the stringers 116 on the adjacent production fuselage assembly on the opposite side of the H-fitting 192, such as with fasteners 176. The lateral portion 198 of the H-fitting 192 can be affixed to the hoop strap 190, such as with fasteners 176. Because of the added thickness of the splice plate, in some implementations, a footing between longitudinal members 194 or a straight portion 196 of the H-fitting 192 and the flange of the stringer on the repaired fuselage assembly 101A, to which the longitudinal members 194 of H-fitting 192 is affixed, is not needed.

Figure 10:
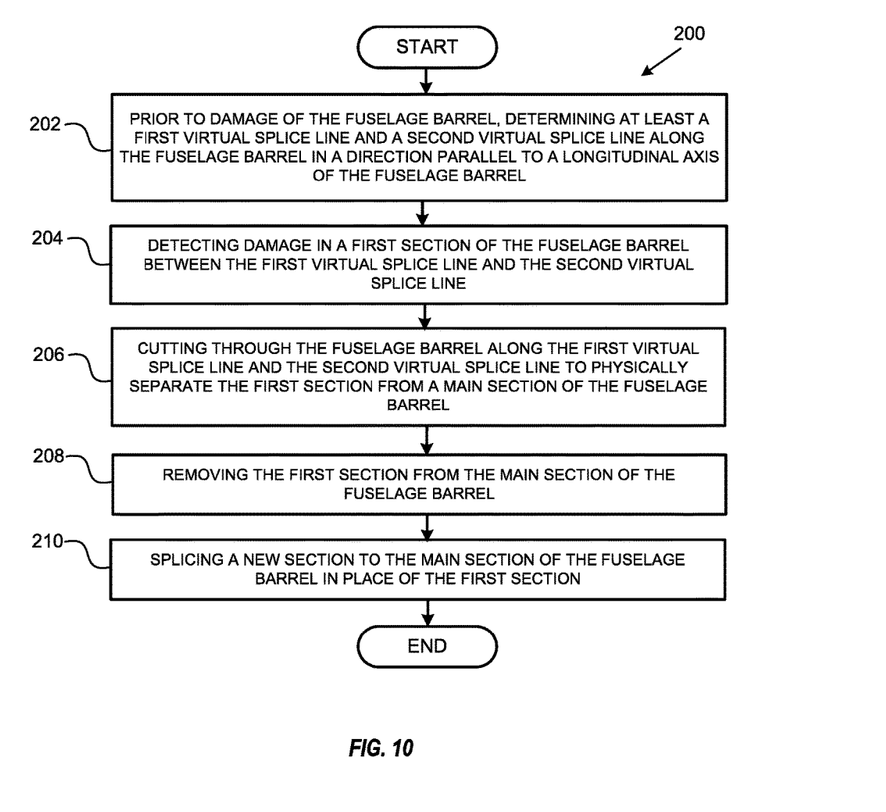
FIG. 10 is a method of repairing damage to a fuselage barrel of an aircraft, according to one or more embodiments of the present disclosure.

Referring to FIG. 10, one embodiment of a method 200 of repairing damage to a fuselage barrel of an aircraft is shown. The fuselage barrel can have a one-piece construction and be made from a fiber-reinforced polymer in certain implementations. Moreover, the features and elements associated with the method 200 can be the same as or analogous to the like features and elements of the aircraft 100 and fuselage barrel assembly 101 presented above.

The method 200 includes, prior to damage of the fuselage barrel, determining at least a first virtual splice line and a second virtual splice line along the fuselage barrel in a direction parallel to a longitudinal axis of the fuselage barrel at step 202. In some implementations, determining the first virtual splice line and/or the second virtual splice line includes detecting a path or paths along an interior surface of the fuselage barrel that has a line of sight from one end of the path or paths to an opposite end of the path. The first virtual splice line and/or the second virtual splice line is located along the one of the paths. The method 200 may also include determining at least a third virtual splice line along the fuselage barrel 102 in a direction parallel to a longitudinal axis 106 of the fuselage barrel 102, prior to damage of the fuselage barrel 102.

Additionally, the method 200 includes detecting damage in a first section of the fuselage barrel between the first virtual splice line and the second virtual splice line at step 204. Generally, the damage to the fuselage barrel can be detected manually, such as via a visual inspection, or automatically, such as via sensors and electronic systems.

The method 200 also includes cutting through the fuselage barrel along the first virtual splice line and the second virtual splice line to physically separate the first section from a main section of the fuselage barrel at step 206. Cutting the fuselage barrel can be performed using any of various cutting techniques known in the art, such as mechanical (e.g., blade) cutting, optical or laser cutting, plasma cutting, and the like. Generally, cutting the fuselage barrel does not include cutting the underlying sub-structure attached to the fuselage barrel, such as shear ties and frame elements. In some implementations, the shear ties and frame elements are removed prior to cutting through the fuselage barrel.

Also, the method 200 includes removing the first section from the main section of the fuselage barrel at step 208. Removing the first section from the main section can include decoupling a frame element from a first shear tie coupled to the fuselage barrel over the first virtual splice line and from a second shear tie coupled to the fuselage barrel over the second virtual splice line. Additionally, removing the first section from the main section may include decoupling the first shear tie from the fuselage barrel and decoupling the second shear tie from the fuselage barrel. As defined herein, decoupling can include trimming, cutting, shearing, loosening, unfastening, or otherwise removed. Where the aircraft includes multiple fuselage barrels, removing the first section from the main section of the fuselage barrel can include decoupling, along production splices, the first section of the fuselage barrel from adjacent fuselage barrels.

The method 200 additionally includes splicing a new section to the main section of the fuselage barrel in place of the first section at step 210. Splicing the new section to the main section of the fuselage barrel can include forming a first butt joint, along the first virtual splice line, and a second butt joint, along the second virtual splice line. Splicing can include overlaying the first butt joint with a first splice plate, overlaying the second butt joint with a second splice plate, and fastening the first splice plate and the second splice plate to the main section of the fuselage barrel the new section. Splicing may also include coupling a first replacement shear tie to the first splice plate, coupling a second replacement shear tie to the second splice plate, and coupling the frame element to the first replacement shear tie and the second replacement shear tie. Furthermore, splicing can include intercoupling adjacent first splice plate segments of the first splice plate with at least one coupler, and intercoupling adjacent second splice plate segments of the second splice plate with at least one coupler. Splicing can also include positioning a first filler between the first splice plate and the first butt joint and between the first stringer and a third stringer of the new section and positioning a second filler between the second splice plate and the second butt joint and between the second stringer and a fourth stringer of the new section.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method of replacing a portion of a fuselage barrel of an aircraft having a seamless construction, comprising:
   determining at least a first splice line and a second splice line along the fuselage barrel in a direction parallel to a longitudinal axis of the fuselage barrel;
   subsequent to determining at least the first splice line and the second splice line, detecting damage in a first section of the fuselage barrel between the first splice line and the second splice line;
   cutting through the fuselage barrel, after detecting damage, along the first splice line and the second splice line to physically separate the first section from a main section of the fuselage barrel;
   removing the cut first section from the main section of the fuselage barrel; and
   splicing a new section, that is not co-formed with the main section, to the main section of the fuselage barrel in place of the removed first section.

2. The method according to claim 1, wherein:
   the fuselage barrel extends longitudinally along the longitudinal axis from a first end to a second end; and
   the first splice line and the second splice line both extend from the first end of the fuselage barrel to the second end of the fuselage barrel.

3. The method according to claim 1, wherein splicing the new section to the main section of the fuselage barrel comprises forming a first butt joint, along the first splice line, and a second butt joint, along the second splice line, parallel to the longitudinal axis, between the new section and the main section of the fuselage barrel.

4. The method according to claim 3, wherein splicing the new section to the main section of the fuselage barrel further comprises:
   overlaying the first butt joint with a first splice plate;
   overlaying the second butt joint with a second splice plate; and
   fastening the first splice plate and the second splice plate to an interior surface of the main section of the fuselage barrel and an interior surface of the new section.

5. The method according to claim 4, wherein:
   removing the first section from the main section of the fuselage barrel comprises:
      decoupling a frame element, extending circumferentially about the fuselage barrel, from a first shear tie coupled to the fuselage barrel over the first splice line and from a second shear tie coupled to the fuselage barrel over the second splice line;
      decoupling the first shear tie from the fuselage barrel; and
      decoupling the second shear tie from the fuselage barrel; and
   splicing the new section to the main section of the fuselage barrel comprises:
      coupling a first replacement shear tie to the first splice plate, wherein the first replacement shear tie is configured differently than the first shear tie;
      coupling a second replacement shear tie to the second splice plate, wherein the second replacement shear tie is configured differently than the second shear tie; and
      coupling the frame element to the first replacement shear tie and the second replacement shear tie.

6. The method according to claim 4, wherein:
   the first splice plate comprises multiple first splice plate segments arranged substantially end-to-end along the first butt joint;
   the second splice plate comprises multiple second splice plate segments arranged substantially end-to-end along the second butt joint;
   splicing the new section to the main section of the fuselage barrel further comprises intercoupling adjacent first splice plate segments with at least one coupler fixed to and spanning at least portions of the adjacent first splice plate segments; and
   splicing the new section to the main section of the fuselage barrel further comprises intercoupling adjacent second splice plate segments with at least one coupler fixed to and spanning at least portions of the adjacent second splice plate segments.

7. The method according to claim 4, wherein:
   a plurality of stringers, circumferentially spaced apart from each other and extending along the fuselage barrel parallel to the longitudinal axis of the fuselage barrel, are coupled to the fuselage barrel;
   the plurality of stringers are grouped into at least a first pair of stringers, comprising a first stringer, and a second pair of stringers, comprising a third stringer;
   the first splice line extends between the first pair of stringers; and
   the second splice line extends between the second pair of stringers.

8. The method according to claim 7, wherein splicing the new section to the main section of the fuselage barrel comprises:
   positioning a first filler between the first splice plate and the first butt joint and between the first stringer and a second stringer of the new section; and
   positioning a second filler between the second splice plate and the second butt joint and between the third stringer and a fourth stringer of the new section.

9. The method according to claim 7, wherein the fuselage barrel, first splice plate, second splice plate, and plurality of stringers are made from a fiber-reinforced polymer.

10. The method according to claim 1, wherein:
    the aircraft comprises multiple fuselage barrels coupled to each other in an end-to-end manner to form a fuselage of the aircraft;
    removing the first section from the main section of the fuselage barrel comprises decoupling the first section of the fuselage barrel from adjacent fuselage barrels; and
    splicing the new section to the main section of the fuselage barrel comprises coupling the new section to adjacent fuselage barrels.

11. The method according to claim 1, wherein the new section is pre-manufactured, responsive to a location on the fuselage barrel of the first splice line and the second splice line.

12. The method according to claim 1, wherein determining at least the first splice line and the second splice line comprises:
    detecting a path along an interior surface of the fuselage barrel having a line of sight from one end of the path to an opposite end of the path; and locating one of the first splice line and the second splice line along the path.

13. The method according to claim 1, wherein each of the first section and the new section forms at least a quarter of the fuselage barrel.

14. The method according to claim 1, further comprising, determining at least a third splice line along the fuselage barrel in a direction parallel to a longitudinal axis of the fuselage barrel.

* * * * *